(No Model.) 4 Sheets—Sheet 1.
E. WHITNEY.
COTTON HARVESTER.
No. 526,209. Patented Sept. 18, 1894.
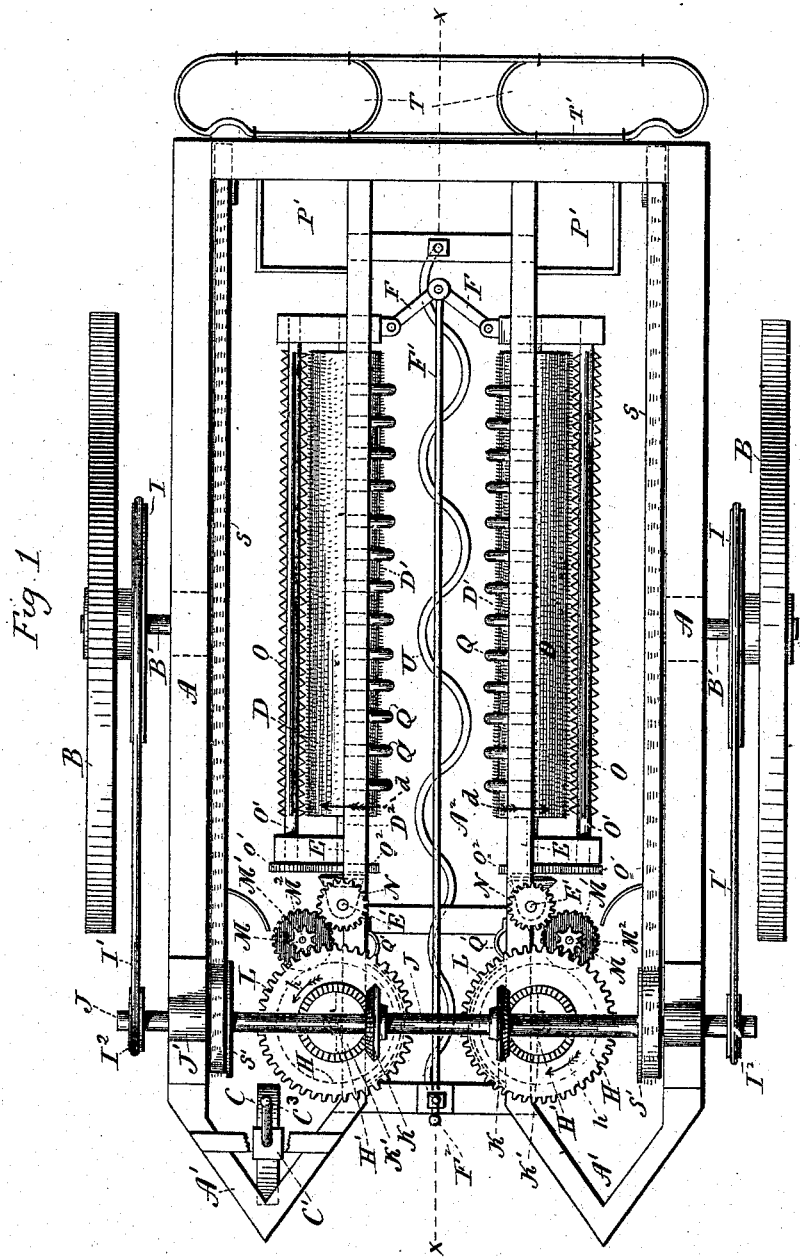

(No Model.)  
4 Sheets—Sheet 2.
E. WHITNEY.
COTTON HARVESTER.
No. 526,209. Patented Sept. 18, 1894.
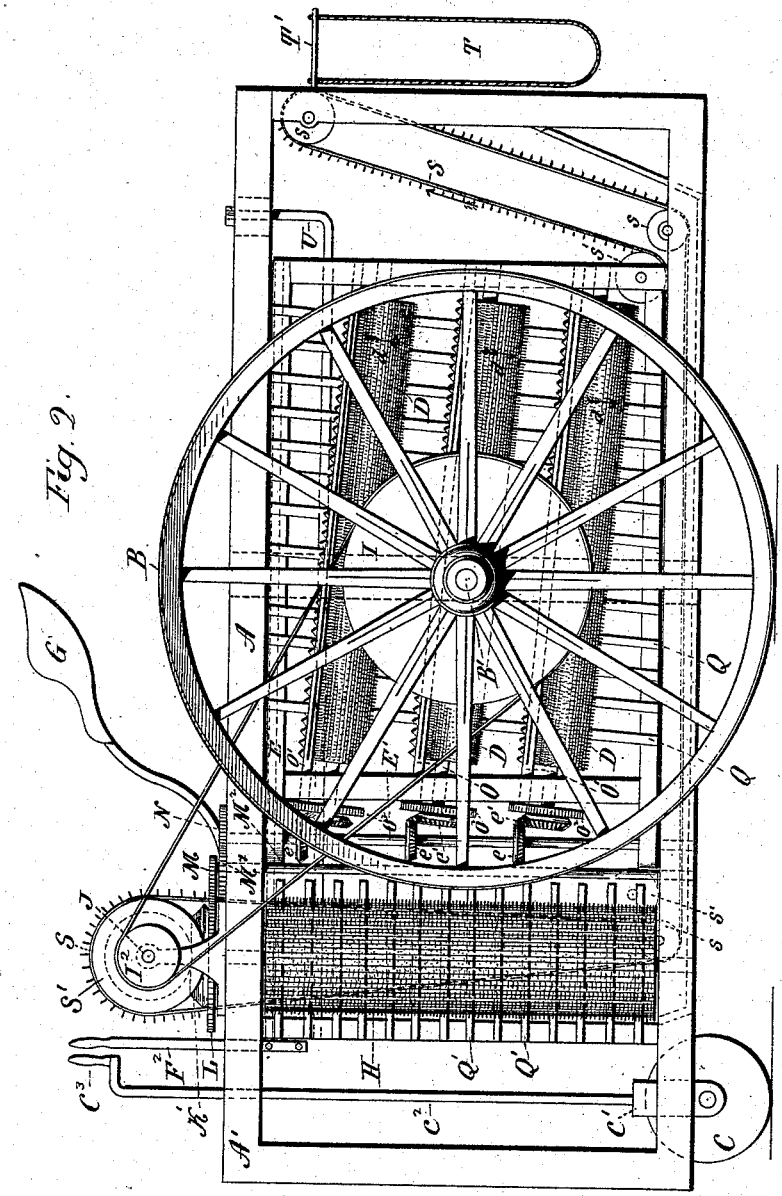

(No Model.) 4 Sheets—Sheet 3.
E. WHITNEY.
COTTON HARVESTER.
No. 526,209. Patented Sept. 18, 1894.
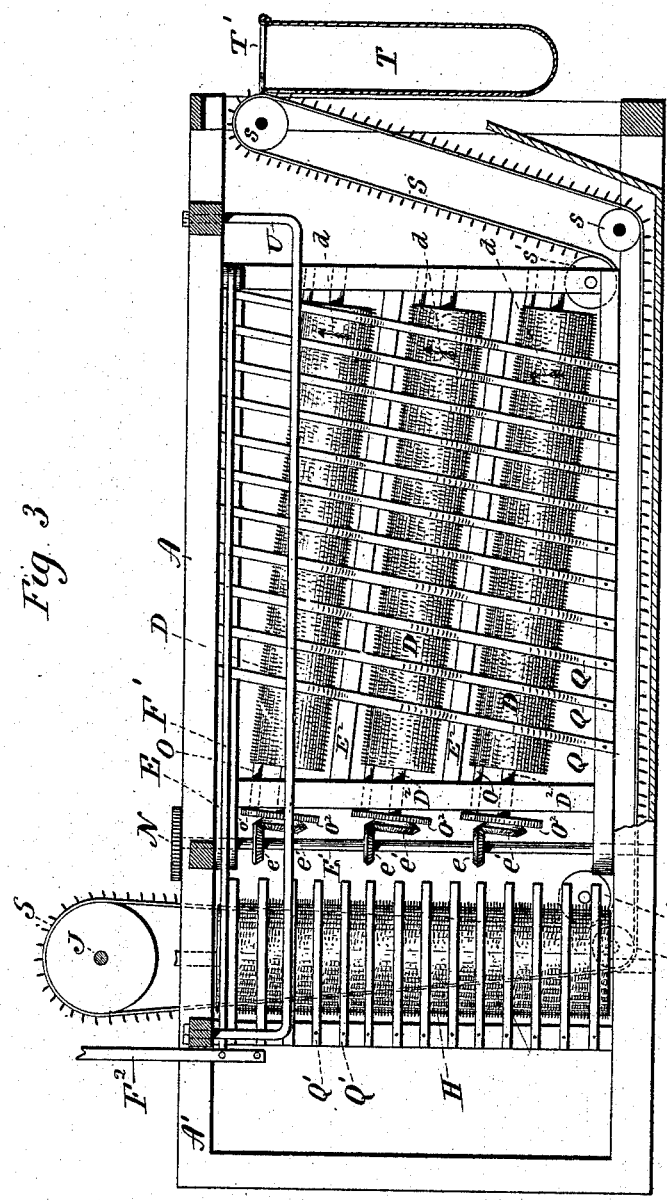
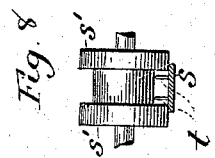
Witnesses
Eli Whitney
Inventor
By Attys
Earle Seymour (No Model.) 4 Sheets—Sheet 4.
E. WHITNEY.
COTTON HARVESTER.
No. 526,209. Patented Sept. 18, 1894.
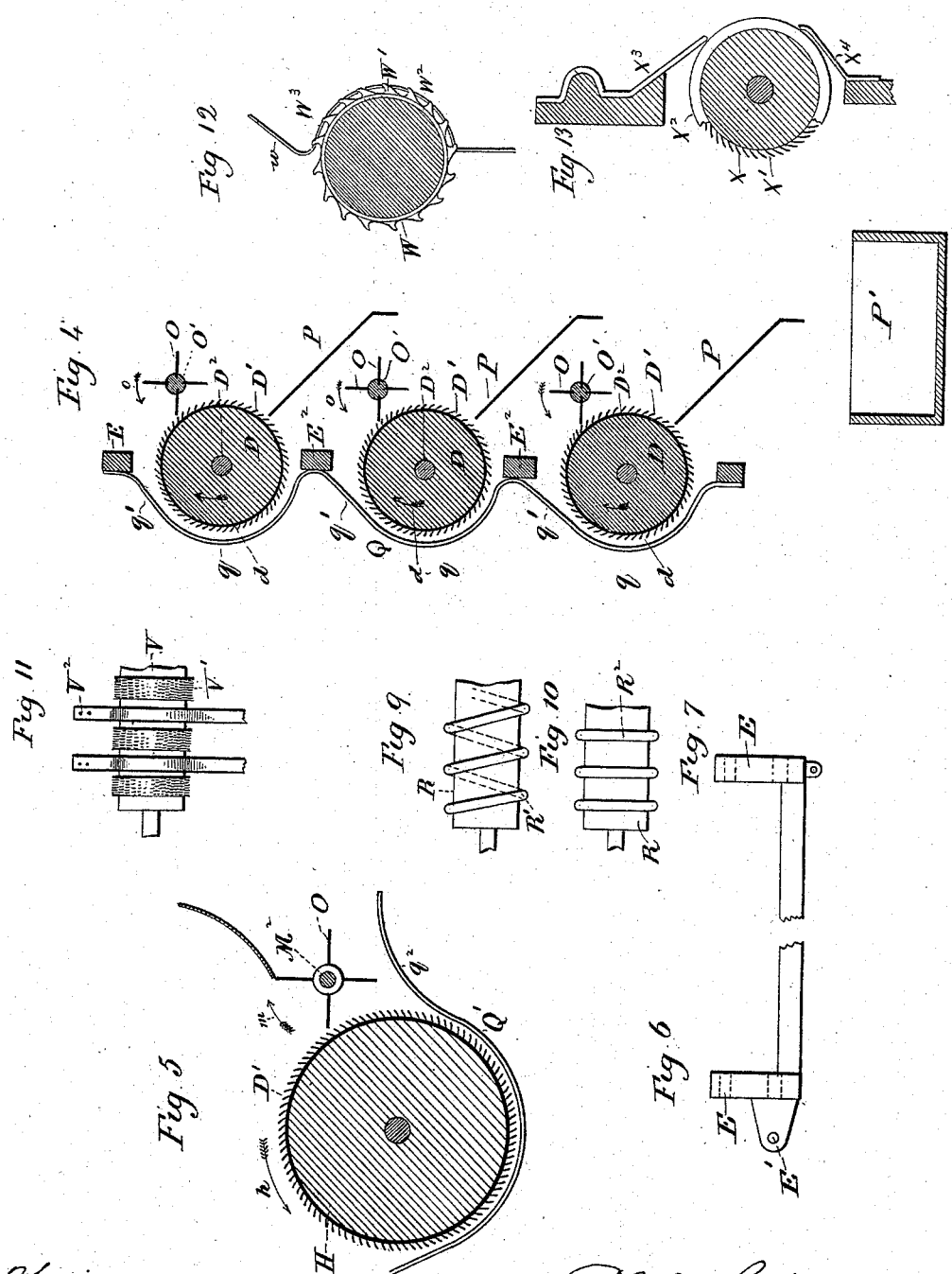

UNITED STATES PATENT OFFICE.

ELI WHITNEY, OF NEW HAVEN, CONNECTICUT.

COTTON-HARVESTER.

SPECIFICATION forming part of Letters Patent No. 526,209, dated September 18, 1894.

Application filed June 17, 1893. Serial No. 477,947. (No model.)

*To all whom it may concern:*

Be it known that I, ELI WHITNEY, of New Haven, in the county of New Haven and State of Connecticut, have invented a new Improvement in Cotton-Harvesters; and I do hereby declare the following, when taken in connection with accompanying drawings and the letters of reference marked thereon, to be a full, clear, and exact description of the same, and which said drawings constitute part of this specification, and represent, in—

Figure 1, a plan view of one form which a cotton-harvester constructed in accordance with my invention may assume; Fig. 2, a view thereof in side elevation; Fig. 3, a view in vertical central longitudinal section on the line $x-x$ of Fig. 1; Fig. 4, a detached broken view in vertical transverse section through the picking-cylinders and strippers of one of the swinging-frames, the said view also showing a guard combined with the frame for protecting the plants and lifting the trash away from the cylinders; Fig. 5, a detached view in horizontal section through one of the vertical cylinders of the machine, together with its stripper and a guard; Fig. 6, a broken plan view of the forward end of one of the swinging-frames; Fig. 7, a similar view of the rear end of one of the said frames; Fig. 8, a detached view in rear elevation showing one of the endless belts in transverse section and one of the pulleys thereof; Fig. 9, a detached broken view of a picking-cylinder having an auxiliary guard applied to it. Fig. 10, is a detached broken view of a picking cylinder showing a modified form of auxiliary guard. Fig. 11 is a broken view of a picking cylinder showing a modified arrangement of teeth and primary guards. Figs. 12 and 13 are sectional views showing modified forms which the guards may assume, Fig. 12 also showing sheet-metal picking teeth as a preferred substitute for card-clothing.

My invention relates to an improvement in cotton-harvesters, the object being to produce a simple and durable apparatus, capable of operation by unskilled labor, adapted to be adjusted to the size of the cotton plants, constructed with special reference to avoid injuring the same, and having a large capacity for work, picking the cotton clean, and rejecting the trash such as husks, leaves, and twigs.

With these ends in view, my invention consists in a cotton-harvester having certain details of construction and combinations of parts as will be hereinafter described and pointed out in the claims.

My improved machine, as shown in Figs. 1 to 8 inclusive of the drawings, has an oblong frame A, which may be of any approved construction, and is mounted upon two large wheels B B, adapted in their separation from each other to run in paths on opposite sides of a row of cotton plants. A small wheel C, mounted in the forward end of the frame so as to be turned to the right or left, provides for steering the harvester, the fork C' of the said wheel having connected with it a vertical steering-rod C², furnished at its upper end with a steering-handle C³. I do not, however, limit myself to any particular means for steering my improved machine. The forward end of the frame is constructed to form two corresponding wedge-shaped deflectors A' A', which deflect the cotton plants into a central longitudinal passage A², extending throughout the length of the machine, and provided to allow the same to be run over a row of cotton plants which may be said to pass through the said passage, although in fact, the harvester passes over the plants. The picking of the cotton is effected in part by means of picking cylinders D, which, as shown in the drawings, are journaled in positions slightly inclined from the horizontal, in two frames E E, respectively swung or pivoted by their forward ends, on vertical shafts E' E', located directly opposite each other in the forward part of the machine-frame A. The picking cylinders D, being mounted in vertical series one above the other in the said frames, are thus located on opposite sides of the passage A² through the frame, and in position to act upon the plants as the harvester is drawn forward over the same. The passage A² will be adapted in width to accommodate the largest and bushiest plants which it is designed that the machine shall ever act upon, and to enable it to act upon the smaller plants I provide for virtually contracting the passage by drawing the rear ends of the said frames together. For this purpose I join them by a toggle connection, consisting of two members F F, pivotally connected at their outer ends with the rear ends of the frame, and having their inner ends pivotally attached to a horizontal operating-rod F', the extreme forward end of which is connected with an upright operating lever F², which stands near the steering-handle C³. It will be readily understood that by suitably operating this lever, the swinging-frames may be made to close together or separate, so as to contract or expand the passage which receives the cotton plants, and it is designed that the operator who rides upon the machine in a seat G, thereto provided, will manipulate this lever in his judgment, according to the size of the cotton-plants, which may vary largely in the same field. The respective picking-cylinders D, are provided with picking-teeth which may be of any desired character and construction. As shown in Fig. 4 of the drawings, I employ card-clothing D'. In front of the said frames E E, I locate, opposite each other, two upright picking-cylinders H H, situated at the extreme forward end of the passage A². The said cylinders are also covered, as herein shown, with carding-cloth D'. I would have it distinctly understood, however, that I do not limit myself to the use of card-clothing, which may be replaced by teeth applied separately or otherwise, and whether sharp or blunt, by strips of sheet-metal having serrated edges, forming saw-teeth, or by teeth of any other form that will suffice to pick cotton. In Fig. 12 I have shown a portion of a cylinder having teeth W' applied separately in isolated circumferential rows arranged at a right angle to its axis. The cylinders H H are rotated in the direction shown by the arrows $h$ in Figs. 1 and 5 of the drawings, which is opposite to the direction in which the harvester passes over the cotton plants, while the cylinders D, are rotated in the direction of the arrows $d$, seen in Figs. 1, 3 and 4, and hence upward with reference to the plants. The gearing for driving the said picking cylinders may take a variety of forms and I do not limit myself to any particular way of driving them. As herein shown the respective axles B' B' of the wheels B B are furnished with driving-pulleys I I, over which run belts I' I', which also run over driving-pulleys I² I² mounted upon the respective ends of a horizontal shaft J, journaled at its ends in bearings J' J' located upon the opposite sides of the forward end of the machine-frame A. This shaft carries two beveled gear-wheels K K, located in vertical planes, and meshing into corresponding beveled gear wheels K' K', located in horizontal planes, and respectively mounted upon the upper ends of the shafts H' H' of the picking-cylinders H H, which are respectively provided also with large horizontal wheels L L, which mesh into pinions M M carried by wheels M' M', mounted on vertical shafts M² M², and in turn meshing into pinions N N mounted on the upper ends of the shafts E' E', which as before mentioned, form the centers on which the swinging frames E E turn. Each of the vertical shafts E' is provided with three beveled gears $e$, respectively engaging with corresponding bevel-gears $e'$ mounted upon the forward ends of the shafts D² carrying the picking-cylinders D, mounted in the said swinging frames E E, and inclined from the horizontal, their forward ends being the higher. Three strippers journaled in each of the swinging frames E, are each composed, as herein shown, of four saws O, and a shaft O', to which the same are attached. These strippers are located behind the respective picking cylinders D, and are rotated in the direction in which the teeth of the same extend, as shown by the arrows $o$, in Fig. 4. I do not limit myself to constructing these strippers in any particular way, for obviously their particular construction must be adapted to the particular character of the teeth employed upon the picking cylinders D. Thus, instead of using saws, I might employ pins arranged in a drum or cylinder in accordance with the arrangement of the picking teeth. The lint removed from the picking-cylinders D, by means of the said strippers, is thrown from them upon the chutes P, constructed and mounted in the frame of the machine in any suitable manner, and arranged to direct the lint into troughs P', located in the bottom of the machine, one of the same being shown in Fig. 4 of the drawings. The shafts O' of the said strippers are arranged parallel with the shafts D² of the picking cylinders D, each shaft O' being furnished at its forward end with a small wheel $o'$, which meshes into a larger wheel $o^2$, mounted on the adjacent end of the shaft D² of the picking-cylinder. The vertical picking cylinders H H are provided with corresponding vertically arranged strippers, each composed of saws O, and one of the shafts M² before mentioned, the upper end of each of the said shafts being furnished, as before described, with a wheel M', and a pinion M. The strippers of the upright picking-cylinders H, rotate in the direction of the arrows $m$, as seen in Fig. 5, and discharge the lint which they remove from the said wheels into the forward ends of the troughs P' which extend throughout the length of the frame of the machine on the opposite sides thereof; but, as before stated, I do not limit myself to any particular way of driving the picking cylinders or their strippers.

Each picking cylinder employed in my improved machine is furnished with guards, the primary function of which is to screen the trash from the lint. As preferably constructed and arranged they will also act as fenders to protect the cotton plants from the teeth of the cylinders. These guards may assume a variety of forms, and I do not limit myself to any particular construction, having shown herein several ways in which they may be made. The form shown in Fig. 4 of the drawings, consists of a length of heavy wire Q, attached to the inner face of the swinging frame E, and containing three substantially semi-circular bends $q$, adapting it to fit over those portions of the picking cylinders D, projecting inward from the frame to which it is attached at its ends, and to inclined posts $E^3$, forming a part of the frame, and constituting intermediate supports for the guard. I employ a number of such guards, which are arranged, as shown in Fig. 3 of the drawings, at right angles to the axial centers of the picking cylinders, being therefore slightly inclined from the vertical. These guards, as thus arranged, virtually constitute a grate before the cylinders. In practice I shall arrange these guards about one and a quarter inches apart, more or less, and in such a manner that while they will prevent the cotton-plants and unripe bolls from being engaged with and torn by the teeth of the picking-cylinders, they will not prevent the open cotton-bolls from being exposed to the teeth. In this way I prevent the plants from being injured. More or less trash, such as leaves, twigs and husks will, however, be torn away from the plants by the teeth, and in order to prevent this from being gathered with the lint, I provide for separating it therefrom by bending the guards, so that they will leave the cylinders tangentially, at points above the same and ahead of the direction in which they are rotating, and where they stop picking. These portions of the guards are indicated by $q'$ in Fig. 4 of the drawings, their action being to lift the trash away from the cylinders, for the trash being located on the outside surfaces of the guards, and being too coarse in its nature to pass readily between the same, will be caused to ride up the inclines which the said tangential portions present, and thus be separated from the lint, and when so detached, fall to the bottom of the machine. The guards $Q'$ shown in Figs. 3 and 5 of the drawings, for the upright picking cylinders H H, are of the same character as the guards Q just described, though each guard contains but one bend. Each of the guards $Q'$ is attached at its respective ends to the frame of the machine, each is bent to conform to the curvature of the cylinder, and each contains a tangential bend $q^2$, located to the rear of the cylinder where the same stops picking, for lifting the trash away from the cylinder and the lint. The guards $Q'$ are arranged in horizontal planes, one above the other, as well shown by Fig. 3 of the drawings, and form in effect a grating, standing between the teeth of the vertical cylinders and the cotton-plants, their function being to protect the plants from injury, and to lift the trash away from the cylinders, whereby it is prevented from being carried along to the strippers, and gathered with the lint. It will thus be seen that the guards Q and $Q'$ have the same primary functions of lifting the trash away from the cylinder, and this they will be adapted to do however constructed, applied or arranged; but it will be understood that however constructed and arranged they will always form a vertical screen between the longitudinal passage of the machine and the picking cylinders. If preferred I may also employ auxiliary guards attached directly to the cylinders, as indicated by Fig. 9 of the drawings, in which a picking-cylinder R, is shown as being provided with a spirally arranged guard $R'$. To avoid confusion in referring to the guards, I shall hereinafter refer to the guards first described as the primary or main guards and those now to be described as auxiliary guards. Instead of providing the cylinders with spirally arranged auxiliary guards, as shown in Fig. 9, I may provide them with a number of circumferential rings $R^2$, as shown in Fig. 10, the said rings being suitably spaced and arranged at a right angle to the axis of the cylinder; but these auxiliary guards do not take the place of the primary or lifting guards, not being adapted to lift the trash away from the cylinders as the same rotate to gather the cotton from the bolls. Their funtion is to prevent the teeth from getting too much hold on the cotton plants which they ward off and prevent from sinking in too deep between the teeth, or from being drawn in too far thereby. They act, in other words, as fenders for the plants. I would call attention to the fact that I arrange the cylinders so that they expose half, or nearly half of their circumferences for picking the cotton.

I employ two endless belts S, for conveying the cotton from the troughs $P'$ to a bag, or other receptacle T, suspended at the rear end of the machine from a wire frame $T'$. Each of these belts runs over suitably arranged pulleys $s\ s'$, mounted in right positions in the frame. Each belt is provided upon its upper surface with two rows of polished and pointed teeth $t$, with which the cotton is engaged, and which operate to throw the same, as it were, into the receptacle T. To accommodate these teeth, which are located within the edges of the belt the pulleys $s'\ s'$ are each centrally cut away, as shown by Fig. 8 of the drawings. The belts pass over and are driven by, wheels $S'\ S'$, mounted upon the shaft J, which is driven from the main wheels B B by belts $I'$ $I'$. I also prefer to use in my machine a deflector U, which, as shown in Fig. 1 of the drawings, consists of a rod, bent into serpentine form, and supported at its opposite ends within the central longitudinal passage $A^2$ of the machine. The function of this rod is to impart a waving lateral movement to the cotton plants, whereby they are alternately thrown from one side of the said passage to the other, and their exposure to the picking action of the cylinders proportionately increased.

I do not limit myself to any particular way of constructing the frame of the machine, as long as the same has a central longitudinal passage or to constructing and mounting the swinging frames in which some of the picking cylinders are located, nor do I limit myself, as I have stated, to any particular way of driving the cylinders. If preferred, also the cylinders in the swinging frames may be arranged vertically instead of substantially horizontally, as herein shown, and I may, if desired, dispense with the upright cylinders located in front of the swinging frames, but I prefer to employ them.

In the modified construction shown by Fig. 11 of the drawings, the picking cylinder V, is provided with isolated, circumferential bands V', of carding cloth, sufficiently separated from each other to receive between them main guards $V^2$, attached in any convenient manner to the harvester for preventing the stems and brushy parts of the cotton-plants from being engaged with and injured by the teeth of the carding-cloth. The outer ends of these guards are inclined on the principle of the inclines $q'$ of the guards shown by Fig. 4, whereby they act to lift the trash away from the cylinders, as well as to protect the plants from the teeth.

As shown in Fig. 12 of the drawings, the picking cylinder W, is furnished with rigid, hooked or curved sheet-metal teeth W', formed upon one edge of a strip $W^2$, of sheet-metal, which is attached to the cylinder. These teeth it will be observed have concave inner and convex outer edges, and are much wider at their bases than at their outer ends, whereby they are adapted to readily part with the lint picked by them, whereas, on the other hand, if they were of uniform cross section, as wire teeth are, they would be inclined to retain the lint. The main guard $W^3$ in this case is arranged below the points of the teeth, and so as to permit the same to catch the lint in the bolls, but still preventing them from getting a sufficient hold on the plants to injure the same. The tangential bend $w$ in the guard causes the same to act as a screen.

Teeth of the construction just described are particularly well adapted to be used with guards having tangential lifting portions, inasmuch as the teeth strike into and hold the lint but do not catch the limbs or twigs of the cotton-plants. Furthermore the teeth by their hold upon the lint, draw the same through the guard which screens the trash from the lint.

In Fig. 13 of the drawings I have shown a picking-cylinder furnished with card-clothing X' as illustrative merely of picking-teeth, and with an auxiliary guard $X^2$ corresponding to the guards $R^2$ shown by Fig. 10. The primary guard $X^3$ in this case has only a screening function, consisting merely of a finger arranged tangentially to the cylinder and riding upon the auxiliary guard which alone acts to ward off the plants from the teeth of the card-clothing. This view also shows a secondary auxiliary guard $X^4$ which at its inner end rides upon the auxiliary guard.

I am aware that a cotton-harvester provided with two adjustable frames hung at their forward ends and arranged to have a passage between them for the cotton-plants, and provided with picking devices, is old. I am also aware that a cotton-harvester provided with picking cylinders and with guards arranged therewith in the form of a screen to prevent twigs and other foreign matter from being gathered with the lint is old. I am also aware that it is old to construct a picking cylinder with circumferential ribs between which means for picking the cotton are located. I do not therefore claim any of those constructions broadly.

Having fully described my invention, what I claim as new, and desire to secure by Letters Patent, is—

1. In a cotton harvester, the combination with a machine-frame constructed with a central longitudinal passage, of swinging two cylinder-frames mounted in the machine-frame on opposite sides of the said passage, and devices for adjusting the frames to increase or decrease the amount of separation between them, picking cylinders journaled in the frames and provided with hooked picking teeth, means for driving the said cylinders, two vertical screens respectively secured to the swinging frames so as to stand between the cylinders and the said passage, and each consisting of a series of guards spaced to permit the teeth to pick between them, and each guard constructed at or about the point where the cylinder with which it co-operates stops picking, with a tangential lifting portion arranged to deflect the trash screened from the lint outward into the said passage; strippers located on opposite sides of the cylinders from the screens, for stripping the lint from the picking teeth, devices for collecting the lint thus picked, and means independent of the cylinders and strippers for imparting lateral movement to the plants to bring their bolls into the range of the picking teeth, substantially as described.

2. In a cotton-harvester, the combination with a machine-frame constructed with a central longitudinal passage, of swinging two cylinder frames mounted in the machine-frame on opposite sides of the said passage, two or more picking cylinders mounted in each of the said cylinder-frames and provided with hooked picking teeth, means for driving the said cylinders, devices for adjusting the said frames to increase or decrease the amount of separation between them, two vertical screens respectively applied to the said frames so as to stand between their cylinders and the central longitudinal passage of the machine-frame, and each composed of a series of guards spaced to permit the teeth to pick between them, and each guard being attached to its cylinder-frame, and constructed with a tangential lifting portion located at or near the point where the cylinder stops picking, and arranged to deflect the trash screened from the lint outward into the said passage; strippers located on opposite sides of the cylinders from the screens for stripping the lint from the picking teeth, devices for collecting the lint thus picked, and means independent of the cylinders and strippers to impart lateral movement to the plants to bring their bolls into range with the picking teeth, substantially as set forth.

3. In a cotton-harvester, the combination with a frame constructed with a longitudinal passage, of two swinging-frames hung by their forward ends in the said frame on opposite sides of the said passage, means for operating the said frames to contract or expand the passage, picking-cylinders mounted in the said swinging-frames, two vertical picking-cylinders located opposite each other in the forward end of the frame in front of the said swinging-frames, and means for driving the said cylinders, substantially as described.

4. In a cotton harvester, the combination with the frame thereof constructed with a central longitudinal passage, of picking-cylinders journaled in the said frame on opposite sides of the said passage, means for driving the said cylinders, and a serpentine deflector attached to the frame in a central longitudinal position with respect to the said passage, and constructed to impart lateral movement to the cotton-plants, substantially as set forth, and whereby the plants are deflected from one side to the other of the said passage, substantially as described.

5. In a cotton-harvester, the combination with the frame thereof constructed with a central longitudinal passage, of picking cylinders journaled in the said frame on opposite sides of the said passage, means for driving the said cylinders, and a deflector consisting of a serpentine rod, attached to the frame, and constructed to impart lateral movement to the cotton plants, substantially as set forth, and whereby the plants are deflected from one side to the other of the said passage, substantially as described.

6. In a cotton-harvester, the combination with the frame thereof, of a picking cylinder mounted therein; projecting, circumferential auxiliary guards applied to the cylinder, picking teeth applied to the cylinder between the guards, and main or primary guards connected with the machine-frame and constructed and arranged to lift the trash away from the cylinder at a point where the same stops picking, and to ride upon the auxiliary guards, substantially as set forth, and whereby the auxiliary guards prevent the teeth from taking hold of the plants by warding the same off, and whereby the primary guards act in opposition to the teeth and hold the plants and trash back while the teeth pull the lint between them.

7. In a cotton harvester, the combination with a machine-frame constructed with a central longitudinal passage, of picking cylinders located on opposite sides of the said passage and provided with picking teeth, means independent of the cylinders for imparting lateral movement to the plants to bring their bolls into the range of the picking teeth, substantially as set forth, and whereby the cotton plants are caused to sway laterally back and forth transversely to the length of the passage as the machine passes over them.

In testimony whereof I have signed this specification in the presence of two subscribing witnesses.

ELI WHITNEY.

Witnesses:
FRED C. EARLE,
GEO. D. SEYMOUR.